(No Model.)
T. MAYHEW.
CULINARY DEVICE.
No. 592,096. Patented Oct. 19, 1897.
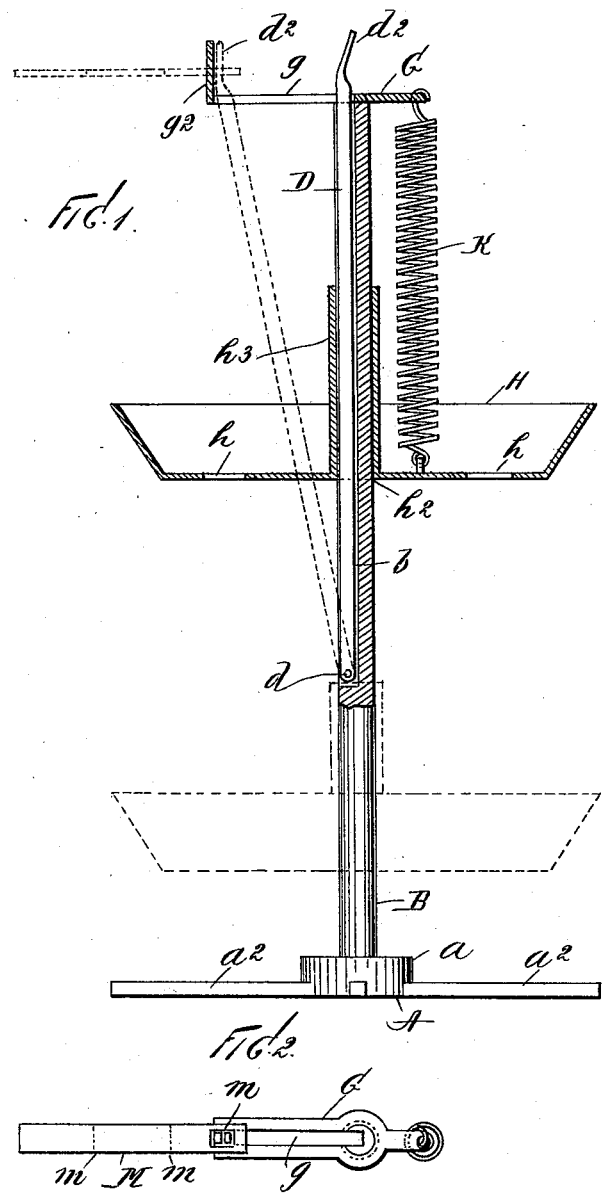
WITNESSES:
John Buckler,
C. Gerst
INVENTOR
Theophilus Mayhew
BY
Edgar Tate & Co
ATTORNEYS.

UNITED STATES PATENT OFFICE.

THEOPHILUS MAYHEW, OF DETROIT, MICHIGAN.

CULINARY DEVICE.

SPECIFICATION forming part of Letters Patent No. 592,096, dated October 19, 1897.

Application filed February 4, 1897. Serial No. 621,918. (No model.)

*To all whom it may concern:*

Be it known that I, THEOPHILUS MAYHEW, a citizen of the United States, and a resident of Detroit, in the county of Wayne and State of Michigan, have invented certain new and useful Improvements in Culinary Devices, of which the following is a specification, reference being had to the accompanying drawings, forming a part thereof, in which similar letters of reference indicate corresponding parts.

This invention relates to culinary devices; and the object thereof is to provide an improved device of this class for boiling eggs, and by means whereof the eggs may be held in the boiling water a predetermined length of time, when they will automatically be raised therefrom.

The invention is fully disclosed in the following specification, of which the accompanying drawings form a part, in which—

Figure 1 is a side elevation of my improved culinary device, parts thereof being shown in section; and Fig. 2, a plan view of the upper portion thereof.

In the practice of my invention I provide a culinary apparatus which is adapted to be placed in a kettle or other vessel provided with water which is adapted to be heated in any desired manner, said device consisting of a base A, which is composed of a central head $a$, and side arms or projections $a^2$, and the base A is provided with a vertical standard B, the upper portion of which is provided with a longitudinal vertical slot $b$, which extends to near the bottom thereof, and in which is pivoted an arm D, the pivotal connection of the arm D being shown at $d$.

The upper end of the standard B is provided with a cross-head G, which projects at each side thereof and one end of which is provided with a longitudinal slot $g$, at the outer end of which is a vertical plate $g^2$, and the upper end of the arm D extends through the slot $g$ and is provided with an upwardly-directed projection $d^2$, which is of the same width as the upper end of the plate $g^2$.

Mounted on the standard B is a pan or other receptacle H, the bottom of which is provided with perforations $h$, and the central portion of the bottom with an opening $h^2$, around which is formed an upwardly-directed tube $h^3$, and secured to the bottom of the pan or receptacle H is a spiral spring K, the upper end of which is secured to one end of the cross-head G.

In operation the device, constructed as described, is placed in a kettle, pot, or other vessel and is supported vertically therein by means of the base A, and the eggs to be boiled are placed in the pan or receptacle H, and said pan or receptacle is depressed until the upper end of the tube $h^3$ is below the lower end of the arm D. The upper end of the arm D is then swung outwardly into the position shown in Fig. 1, and the extension $d^2$ thereof and the plate $g^2$ are then connected by a fuse M, which may be of any desired length, and which is preferably provided with cross lines or perforations $m$. The fuse is provided with an aperture $m^2$ at one end, through which the projection $d^2$ of the arm D and the upper end of the plate $g^2$ are passed, and the separate sections of said fuse are so formed as to consume about one minute in the burning thereof, and by means of this device the length of time that the eggs are retained in the boiling water may be regulated as desired. If it is desired to retain the eggs in the boiling water but one minute, the fuse is cut off, so that but one section thereof will be employed. If two minutes are required, two of these sections are employed, and if three minutes, three of said sections, and so on. It will be understood that the fuse M may be of any desired length, according to the length of time required for boiling the eggs, and that the pan or receptacle H is held in the depressed position by the arm D when it is swung outwardly, as shown in dotted lines in Fig. 1, and when the water has begun to boil the pan or receptacle H, with the eggs therein, is depressed to the position shown in dotted lines in Fig. 1, and the device is then placed in the kettle or other vessel containing the boiling water, and the fuse M is ignited, and at the end of the required time the burning of the fuse will release the arm D, and the spring K will immediately raise the pan or receptacle H out of the boiling water.

This device is simple in construction and operation and perfectly adapted to accomplish the result for which it is intended, and my invention is not limited to the form of the base or other details of the construction herein described; and I reserve the right to make all such alterations therein and modifications thereof as fairly come within the scope of the invention.

Having fully described my invention, I claim as new and desire to secure by Letters Patent—

1. In a culinary device, the combination of a base, a standard supported thereon, a pan or receptacle provided with a central tube, which is mounted on said standard, and vertically movable thereon, and means for raising said pan or receptacle, on said standard, consisting of a spring which is secured thereto, and to the upper end of the standard, said standard being also provided with a vertical slot at one side thereof, in which is mounted a rod which is pivoted therein, at the lower end thereof, and which is adapted to be swung outwardly so as to hold the pan or receptacle in the depressed or lower position, and means for releasing said rod at predetermined intervals of time substantially as shown and described.

2. In a culinary apparatus, the combination with a suitable base, of a vertical standard secured thereto, and provided with a slot, in one side thereof which extends from a predetermined point above the base upwardly, the full length of the standard, a rod or arm pivoted in the lower end of said slot said standard being also provided with a pan or receptacle, having a central tube through which the standard and arm are passed, and being also provided with a cross-head at its upper end, to one end of which is secured the end of a spiral spring, the other end of which is secured to the pan or receptacle, and said cross-head being provided at its opposite end with a slot, to which is secured a vertical plate or arm, and said pivoted arm being adapted to be swung outwardly so as to hold the pan in the depressed position, and the end of the pivoted arm and the plate or arm connected with the cross-head being adapted to be connected by a fuse, substantially as shown and described.

In testimony that I claim the foregoing as my invention I have signed my name, in presence of the subscribing witnesses, this 30th day of January, 1897.

THEOPHILUS MAYHEW.

Witnesses:
JONATHAN A. ZAHN,
THOMAS B. KEYES.